United States Patent [19]
Okano et al.

[11] Patent Number: 5,578,375
[45] Date of Patent: Nov. 26, 1996

[54] GRANULAR MAGNETITE PARTICLES AND PROCESS FOR PRODUCING THE SAME

[75] Inventors: Yoji Okano; Kazuo Fujioka; Koso Aoki, all of Hiroshima; Hiromitsu Misawa, Hatsukaichi; Minoru Kozawa, Higashihiroshima; Naoki Uchida, Otake, all of Japan

[73] Assignee: Toda Kogyo Corporation, Japan

[21] Appl. No.: 313,580

[22] Filed: Sep. 27, 1994

[30] Foreign Application Priority Data

Sep. 30, 1993 [JP] Japan ................... 5-267980
Mar. 31, 1994 [JP] Japan ................... 6-087637

[51] Int. Cl.⁶ ................... B32B 5/16; G11B 5/66; C01G 49/08
[52] U.S. Cl. ................... 428/402; 252/62.55; 252/62.56; 252/62.58; 428/403; 428/405; 428/694 BA; 428/900
[58] Field of Search ................... 428/402, 403, 428/405, 694 BA, 900; 252/62.51, 62.55, 62.56, 62.58; 423/594; 430/106.6

[56] References Cited

U.S. PATENT DOCUMENTS

| | | | |
|---|---|---|---|
| 4,390,361 | 6/1983 | Sueyoshi et al. | 75/0.5 BA |
| 5,232,805 | 8/1993 | Misawa et al. | 430/106.6 |
| 5,336,421 | 8/1994 | Kurita et al. | 252/62.62 |
| 5,389,482 | 2/1995 | Okano et al. | 430/106.6 |

FOREIGN PATENT DOCUMENTS

| | | |
|---|---|---|
| 0487230A1 | 5/1992 | European Pat. Off. . |
| 0566790A1 | 10/1993 | European Pat. Off. . |
| 1-36864 | 8/1989 | Japan . |
| 4-190242 | 7/1992 | Japan . |
| 4-184354 | 7/1992 | Japan . |

OTHER PUBLICATIONS

Patent Abstracts of Japan vol. 7, No. 192 (P-218) (1337) Aug. 1983.
Patent Abstracts of Japan vol. 10, No. 185 (C-357) 2241 Jun. 1986.

*Primary Examiner*—D. S. Nakarani
*Assistant Examiner*—H. Thi Le
*Attorney, Agent, or Firm*—Nixon & Vanderhye

[57] ABSTRACT

Granular magnetite particles useful as coloring pigments assuming a black color and containing elemental aluminum, 3 to 6 wt %, in the magnetite crystal lattice. The magnetite has a spinel structure with a lattice constant of 8.340 to 8.375 Å.

9 Claims, 1 Drawing Sheet

FIG.1

GRANULAR MAGNETITE PARTICLES AND PROCESS FOR PRODUCING THE SAME

BACKGROUND OF THE INVENTION

The present invention relates to granular magnetite particles and a process for producing the same. Particularly, the present invention relates to granular magnetite particles assuming a black color and having a small magnetization, and a process for producing the same.

Granular magnetite particles according to the present invention are mainly intended as materials for coloring pigments for coatings, printing inks, rubber and plastics, and materials for magnetic toners, magnetic carriers and magnetic cards.

Since magnetite particles assume a black color, they are widely used as materials for coloring pigments for coatings printing inks, rubber and plastics.

In addition, since granular magnetite particles are ferromagnetic particles, they are mixed with and dispersed in a resin so as to produce composite particles which are used as material particles for magnetic toners and magnetic carriers for electrostatic copying.

Magnetite particles are sometimes dispersed in a vehicle so as to obtain a magnetic coating. The thus-obtained magnetic coating is directly applied to a card substrate or a magnetic tape obtained by applying the magnetic coating to a base film is adhered to a card substrate by an adhesive. In this way, magnetite particles are also used as material particles for magnetic cards such as credit cards provided with a magnetic stripe, railway tickets, railway season tickets, highway passes, telephone cards and railway cards.

In any of the above-described fields, there is no end to demand for higher capacity and higher quality of the products, and magnetite particles as a material are required to have improved properties, in particular, to have excellent dispersibility in a resin or a vehicle which facilitates the kneading of the particles with the resin or the mixing of the particles with the vehicle.

This fact is described with respect to coloring pigments for coatings, printing inks, rubber and plastics in *Journal of the Japan Society of Color Materials*, vol. 49, No. 1 (1976), page 8, "It seems to be no exaggerating to say that most properties wherein a coating has to possess, are determined by the dispersibility of the pigment in the coating film, in case where the pigment is the same. Theoretically, if the dispersibility of the pigment in the coating film is good, the color tone is vivid, and the fundamental properties intrinsic to the pigment such as a tinting strength and a hiding power are improved. In addition, a gloss, a definition, mechanical properties and an air permeability resistance of the coating film are also improved, which leads to the enhancement of the durability of the coating film. In this way, the dispersibility of a pigment in a coating film is an important factor which determines various properties of the coating film."

With respect to magnetite particles as a material for magnetic toners, Japanese Patent Application Laid-Open (KOKAI) No. 55-65406 (1980) states, ". . . (VII) The mixing degree of the magnetite particles with a resin should be high. The average particle diameter of a toner is ordinarily not more than several ten µm, and the microscopic mixing degree in a toner is important for the properties of the toner . . . ."

With respect to magnetite particles as a material for magnetic carriers, Japanese Patent Application Laid-Open (KOKAI) No. 61-53660 (1986) states, "According to the present invention, . . . the dispersibility of primary particles is improved and the magnetic powder is uniformly dispersed, so that the variation of the charging property and the magnetic characteristics between the particles of a magnetic developing agent is reduced."

As to magnetite particles for magnetic cards, this fact is described in 'Magnetic Cards and Chemical Technique' at pp. 68 to 72 of *Journal of Chemical Technique*, MOL (1985), published by Ohm-sha," . . . the properties are greatly changed with the state of dispersion of a magnetic material . . . . It is important to obtain a good dispersion system."

Magnetite particles are generally produced directly from an aqueous solution, namely, by a wet process, because this process makes it easy to produce discrete particles, in other words, particles having good dispersibility.

This wet process is a process of blowing an oxidizing gas in a temperature range of 60° to 100° C. into an aqueous solution which contains an Fe-containing precipitate such as $Fe(OH)_2$ and $FeCO_3$, and which is obtained by mixing an aqueous ferrous salt solution such as ferrous sulfate and an aqueous alkaline solution such as sodium hydroxide and sodium carbonate (Japanese Patent Publication No. 44-668 (1969)).

However, although the granular magnetite particles obtained in the above-described wet process are discrete, the magnetization is as large as 55 to 70 emu/g, so that magnetic agglomeration is apt to be caused, which is an obstacle to an improvement of the dispersibility.

In addition, the conformity of the granular magnetite particles obtained by a wet process with a resin is very low due to the above-described magnetic agglomeration and the hydrophilic property of the particle surfaces, which increases the obstacle to an improvement of the dispersibility. This fact is described in Japanese Patent Application Laid-Open (KOKAI) No. 58-68754 (1983), "Especially, since fine magnetic particles used for one-component magnetic toners are generally hydrophilic, the dispersibility of the fine magnetic particles in a binder resin is very low, . . . which leads to a low picture quality."

Therefore, in various fields, granular magnetite particles having a small magnetization and subjected to hydrophobic treatment are sometimes in demand in order to enhance the dispersibility of the particles in a vehicle or a resin. This is demanded, especially, in the field of a magnetic toner.

In the case of using granular magnetite particles as the material particles for a magnetic toner, magnetite particles having a small magnetization and hydrophobic particle surfaces are sometimes in demand in order to realize a high picture quality.

With the development of a smaller-sized electrostatic copying machine having a higher capacity such as a higher speed, an improvement of the properties of a magnetic toner as a developer, in other words, a magnetic toner which is capable of developing with a high density and a high resolution has been strongly demanded.

The properties of a magnetic toner have a close relationship with various properties of the magnetic particles contained in a resin, and in order to enable development with a high density, it is necessary to increase the content of the magnetic particles contained in the resin. However, when the content of the magnetic particles is increased, the magnetic particles after development remain on the developed latent image as an agglomerate due to the magnetic agglomeration of the magnetic particles, so that it is difficult to reproduce a fine latent image with fidelity and it is impossible to obtain a high resolution.

In order to obtain a magnetic toner which enables development with a high fidelity and a high resolution, it is necessary to reduce the magnetization of the magnetic particles as much as possible, so that an increase in the magnetic particles in a resin does not cause magnetic agglomeration.

This fact is described in Japanese Patent Application Laid-Open (KOKAI) No. 4-184354 (1992), " . . . . In this way, a toner has been required which enables development with fidelity to signals and a manuscript, in other words, with fidelity to a latent image and, in addition, with a high density. However, it is difficult to satisfy such a demand by using a toner containing a magnetic material. For example, if the content of the magnetic material is merely increased in order to increase the coloring power so as to achieve a high density, the image quality is deteriorated and it is impossible to obtain a high resolution. This is because . . . the size of the spike is related to the magnetic force of the toner. If the content of a magnetic material is increased, the spike also becomes large. Such an spike is apt to generate an agglomerate on the latent image developed by the toner, so that it is difficult to reproduce a fine latent image with fidelity. On the other hand, in order to obtain a high resolution, the content of a magnetic material may be reduced so as to reduce the magnetic agglomeration force, however it leads to not only a reduction in the tinting strength but also a lowering in the developing power and the toner manufacturing efficiency due to an increase in the charge. However, combined use with a coloring agent such as carbon black as a countermeasure is difficult to put to practical use, because the environment dependency may be deteriorated.

. . . To solve these problems, there are some proposals for adjusting the magnetic force so as to obtain a toner having a high performance . . . . " and " . . . It is possible to enhance the fine line reproducibility and obtain a high picture quality by development which has a high fidelity to a latent image and signals, by mixing an appropriate amount of magnetic material having an appropriately small magnetic force . . . . "

Since the surfaces of magnetic particles are hydrophilic, it is difficult to disperse the particles in a resin, and the contents of magnetic particles are nonuniform between magnetic toner particles. As a result, magnetic agglomeration is apt to be caused around the magnetic toner particles having a large content of magnetic particles.

In order to obtain a magnetic toner which enables development with a high density and a high resolution, it is strongly required that the magnetization of the magnetic particles is reduced as much as possible in order to prevent the generation of a magnetic agglomeration force even with a high content of the magnetic particles in a resin, and that the particle surfaces are hydrophobic in order to improve the dispersibility of the particles in the resin.

As magnetic particles having a small magnetization, a magnetic material composed of a metal oxide (concretely, zinc ferrite particles and zinc manganese ferrite particles) in which a magnetization $\sigma_s$ in a magnetic field of 1 kOe is 10 to 40 emu/g and the ferre-diameter in a horizontal direction is 0.05 to 0.5 μm, is known (Japanese Patent Application Laid-Open (KOKAI) No. 4-184354 (1992)).

Various attempts at improving the properties of magnetite particles have also been conducted. For example, there are known a process for producing an $Fe_3O_4$ iron oxide pigment having an excellent particle distribution and an improved oxidation stability, which comprises the steps of adding not less than one equivalent of an aqueous alkaline solution to a ferrous salt solution, and carrying out an air oxidization, thereby producing a spinel type $Fe_3O_4$ iron oxide while adding a hydroxosilicate solution or a hydroxoaluminic acid solution to the solution in the oxidization process of the produced ferrous hydroxide to the $Fe_3O_4$ iron oxide (Japanese Patent Publication No. 1-36864 (1989)); and a toner having excellent stability and blocking resistance, which comprises a magnetic powder containing 0.05 to 10 wt % of aluminum element, and a binder resin in which the content of THF insolubles are less than 10 wt %, and the molecular weight distribution of the THF solubles in GPC has a specified range (Japanese Patent Application Laid-Open (KOKAI) No. 4-190242 (1992)).

Although granular magnetite particles assuming a black color and having a small magnetization, or granular magnetite particles assuming a black color, and having a small magnetization and hydrophobic particle surfaces are now in the strongest demand, such granular magnetite particles have not been produced yet.

The zinc ferrite particles or the zinc manganese ferrite particles described in Japanese Patent Application Laid-Open (KOKAI) No. 4-184354 (1992) have a small magnetization, but since the hue thereof is not black but brown, so that it is impossible to obtain a magnetic toner which enables development with a high density. Further, there is no description nor suggestion of the production of particles assuming a black color in Japanese KOKAI 4-184354.

The granular magnetite particles obtained by the process described in Japanese Patent Publication No. 1-36864 (1989) or Japanese Patent Application Laid-Open (KOKAI) No. 4-190242 (1992) assume a black color which is characteristic of magnetite particles, but the magnetization thereof is so large as to be apt to cause magnetic agglomeration, as shown in Comparative Example 1 which will be described later.

Accordingly, the present invention aims at solving the above-described problems in the related art and providing granular magnetite particles assuming a black color and having a small magnetization.

As a result of studies undertaken by the present inventors so as to solve these problems, it has been found that the granular magnetite particles obtained by blowing an oxygen-containing gas into an alkaline suspension which contains a precipitate containing aluminum and iron, which has a pH of not less than 10, and which is obtained by adding 15 to 70 mol % of an aluminum compound (calculated as Al) based on the ferrous iron in an aqueous ferrous salt solution to an aqueous alkaline solution and then adding the aqueous ferrous salt solution to the thus-obtained mixture, assume a black color and have a magnetization of not more than 50 emu/g in a magnetic field of 1 kOe. The present invention has been achieved on the basis of this finding.

SUMMARY OF THE INVENTION

It is an object of the present invention to provide granular magnetite particles assuming a black color and having a small magnetization.

It is another object of the present invention to provide granular magnetite particles assuming a black color, and having a small magnetization and hydrophobic particle surfaces.

It is still another object of the present invention to provide granular magnetite particles assuming a black color, having a good dispersibility in a vehicle or a resin and suitable as a material for coloring pigments for coatings, printing inks, rubber and plastics, and a material for magnetic toners and magnetic carriers.

To achieve these aims, in a first aspect of the present invention, there are provided granular magnetite particles assuming a black color, containing 3 to 6 wt % of aluminum element in a crystal lattice having a spinel structure with a lattice constant of 8.340 to 8.375 Å, and having a magnetization of not more than 50 emu/g in a magnetic field of 1 kOe.

In a second aspect of the present invention, there are provided granular magnetite particles assuming a black color, containing 3 to 6 wt % of aluminum element in a crystal lattice having a spinel structure with a lattice constant of 8.340 to 8.375 Å, and having a magnetization of 30 to 50 emu/g in a magnetic field of 1 kOe.

In a third aspect of the present invention, there are provided granular magnetite particles coated with a hydroxide of aluminum, assuming a black color, containing 3 to 6 wt % of aluminum element in a crystal lattice having a spinel structure with a lattice constant of 8.340 to 8.375 Å, and having a magnetization of 20 to 45 emu/g in a magnetic field of 1 kOe.

In a fourth aspect of the present invention, there are provided granular magnetite particles subjected to hydrophobic treatment, assuming a black color, containing 3 to 6 wt % of aluminum element in a crystal lattice having a spinel structure with a lattice constant of 8.340 to 8.375 Å, and having a magnetization of 28.5 to 50 emu/g in a magnetic field of 1 kOe.

In a fifth aspect of the present invention, there are provided granular magnetite particles coated with a hydroxide of aluminum and subjected to hydrophobic treatment, assuming a black color, containing 3 to 6 wt % of aluminum element in a crystal lattice having a spinel structure with a lattice constant of 8.340 to 8.375 Å, and having a magnetization of 19 to 45 emu/g in a magnetic field of 1 kOe.

In a sixth aspect of the present invention, there is provided a process for producing granular magnetite particles defined in the first aspect, comprising the steps of: adding 15 to 70 mol % of an aluminum compound (calculated as Al) based on a ferrous in an aqueous ferrous salt solution to an aqueous alkaline solution; adding the aqueous ferrous salt solution to the thus-obtained mixture so as to produce an alkaline suspension which contains a precipitate containing aluminum and iron and which has a pH of not less than 10; and blowing an oxygen-containing gas into the thus-obtained alkaline suspension.

In a seventh aspect of the present invention, there is provided a process for producing granular magnetite particles defined in the third aspect, comprising the steps of: adding 15 to 70 mol % of an aluminum compound (calculated as Al) based on a ferrous in an aqueous ferrous salt solution to an aqueous alkaline solution; adding the aqueous ferrous salt solution to the thus-obtained mixture so as to produce an alkaline suspension which contains a precipitate containing aluminum and iron and which has a pH of not less than 10; blowing an oxygen-containing gas into the thus-obtained alkaline suspension so as to produce granular magnetite particles; and adjusting the pH of the alkaline suspension in the range of 5 to 9 so as to coat the surfaces of the granular magnetite particles with a hydroxide of aluminum.

In an eighth aspect of the present invention there is provided a process for producing granular magnetite particles defined in the fourth aspect, comprising the steps of: adding 15 to 70 mol % of an aluminum compound (calculated as Al) based on a ferrous in an aqueous ferrous salt solution to an aqueous alkaline solution; adding the aqueous ferrous salt solution to the thus-obtained mixture so as to produce an alkaline suspension which contains a precipitate containing aluminum and iron and which has a pH of not less than 10; blowing an oxygen-containing gas into the thus-obtained alkaline suspension so as to produce granular magnetite particles; filtering out the granular magnetite particles; washing the granular magnetite particles with water; and subjecting the granular magnetite particles to hydrophobic treatment.

In a ninth aspect of the present invention, there is provided a process for producing granular magnetite particles defined in the fifth aspect, comprising the steps of: adding 15 to 70 mol % of an aluminum compound (calculated as Al) based on a ferrous in an aqueous ferrous salt solution to an aqueous alkaline solution; adding the aqueous ferrous salt solution to the thus-obtained mixture so as to produce an alkaline suspension which contains a precipitate containing aluminum and iron and which has a pH of not less than 10; blowing an oxygen-containing gas into the thus-obtained alkaline suspension so as to produce granular magnetite particles; adjusting the pH of the alkaline suspension in the range of 5 to 9 so as to coat the surfaces of the granular magnetite particles with a hydroxide of aluminum; filtering out the granular magnetite particles; washing the granular magnetite particles with water; and subjecting the granular magnetite particles to hydrophobic treatment.

DETAILED DESCRIPTION OF THE INVENTION

It is necessary that in the granular magnetite particles according to the present invention, aluminum element is contained in a crystal lattice having a spinel structure (hereinafter referred as "spinel-type crystal lattice"). It is possible to confirm whether or not aluminum element is contained in a spinel-type crystal lattice by measuring the crystal constant.

If no aluminum element is contained in a spinel-type crystal lattice, it is impossible to obtain granular magnetite particles having a small magnetization.

The content of aluminum element in the spinel-type crystal lattice of the granular magnetite particles of the present invention is 3 to 6 wt %, preferably 3 to 5 wt %. If the content of aluminum element is less than 3 wt %, since it is impossible to obtain granular magnetite particles having a small magnetization, the magnetic agglomeration force becomes large, and the dispersibility in a vehicle or a resin and the kneading property in a resin are lowered. When a magnetic toner is produced by using such granular magnetite particles, it is not possible to obtain a high resolution.

The upper limit of the amount of aluminum element contained in the spinel-type crystal lattice of the granular magnetite particles of the present invention is 6 wt %. The larger the content of aluminum element in a spinel-type crystal lattice is, the smaller the magnetization of the granular magnetite particles is apt to be.

The lattice constant of the granular magnetite particles of the present invention is 8.340 to 8.375 Å. The larger the content of aluminum element in a spinel-type crystal lattice is, the smaller the lattice constant is apt to be. When the content of aluminum element is 3 wt %, the granular magnetite particles having a lattice constant of about 8.375 Å are obtained, and when the content of aluminum element is 6 wt % the granular magnetite particles having a lattice constant of about 8.340 Å are obtained.

The magnetization of the granular magnetite particles of the present invention is not more than 50 emu/g, preferably 19 to 50 emu/g.

In the present invention, the larger the content of aluminum element in a spinel-type crystal lattice is, the lower the magnetization is apt to be. For example, when the content of aluminum element is 6 wt %, the granular magnetite particles having a magnetization of about 30 emu/g are obtained. If the magnetization exceeds 50 emu/g, the magnetic agglomeration force of the granular magnetite particles becomes large and the dispersibility in a vehicle and the kneading property in a resin are lowered. When a magnetic toner is produced by using such granular magnetite particles, it is not possible to obtain a high resolution. The preferable magnetization of the granular magnetite particles is 35 to 50 emu/g.

The granular magnetite particles of the present invention may be coated with a hydroxide of aluminum, if necessary. In this case, since the hydroxide of aluminum is non-magnetic, it is possible to obtain granular magnetite particles having a smaller magnetization such as 20 to 45 emu/g. The preferable magnetization of the said granular magnetite particles is 28 to 45 emu/g. In the present invention, the content of the hydroxide of aluminum in the granular magnetite particles is 1 to 9 wt %, preferably 1 to 6.5 wt %.

The granular magnetite particles of the present invention may be subjected to hydrophobic treatment, if necessary. In granular magnetite particles subjected to hydrophobic treatment, the larger the content of aluminum element in a spinel-type crystal lattice is, the smaller the magnetization of the granular magnetite particles is apt to be. When the content of aluminum element is 6 wt %, the granular magnetite particles having a magnetization of about 28.5 emu/g are obtained. The preferable magnetization of the said granular magnetite particles is 30 to 50 emu/g.

The granular magnetite particles of the present invention may be coated with a hydroxide of aluminum and then subjected to hydrophobic treatment, if necessary. The upper limit of the content of a hydroxide of aluminum in the coated and treated granular magnetite particles is not more than 9 wt %. The lower limit of the content of a hydroxide of aluminum in the coated and treated granular magnetite particles is 1 wt %. The preferable content of a hydroxide of aluminum in the coated and treated granular magnetite particles is 1 to 7 wt %. Since the hydroxide of aluminum is non-magnetic, it is possible to obtain granular magnetite particles having a smaller magnetization such as 19 to 45 emu/g. The preferable magnetization of the said granular magnetite particles is 25 to 45 emu/g.

The granular magnetite particles subjected to hydrophobic treatment according to the present invention have a carbon-containing hydrophobic treatment agent such as a coupling agent, silicone and a higher fatty acid on the particle surfaces. The content of the hydrophobic treatment agent in the coated and treated granular magnetite particles is 0.01 to 4.0 wt %, preferably 0.01 to 2.0 wt % (calculated as elemental carbon). If the content is less than 0.01 wt %, the hydrophobic treatment may be insufficient so that an improvement of the dispersibility is insufficient. On the other hand, if the content exceeds 4.0 wt %, the whole content of the hydrophobic treatment agent does not coat on the particle surfaces and a part of the agent unfavorably exists alone in the suspension.

The magnetite particles coated with a hydroxide of aluminum have a stronger hydrophilic property than magnetite particles which are not coated with a hydroxide of aluminum, so that it is especially effective to subject the magnetite particles coated with the hydroxide of aluminum to hydrophobic treatment.

As the coupling agent, silane coupling agent, titanate coupling agent, aluminate coupling agent, etc. are usable.

As the silicone, silicon oil, etc. are usable.

As the higher fatty acid, stearic acid, isostearic acid, palmitic acid, isopalmitic acid, oleic acid, etc. are usable.

The granular magnetite particles of the present invention have a BET specific surface area of 1 to 15 $m^2/g$ preferably 3 to 10 $m^2/g$ and an average particle size of 0.05 to 1.0 μm, preferably 0.05 to 0.5 μm. If the BET specific surface area is less than 1 $m^2/g$ or more than 15 $m^2/g$, the dispersibility of the particles in a resin is lowered.

A processes for producing granular magnetite particles according to the present invention will now be explained.

The granular magnetite particles of the present invention are obtained by adding 15 to 70 mol %, preferably 15 to 50 mol % of an aluminum compound (calculated as Al) based on a ferrous of in an aqueous ferrous salt solution to an aqueous alkaline solution; adding the aqueous ferrous salt solution to the thus-obtained mixture so as to produce an alkaline suspension which contains a precipitate containing aluminum and iron, and which has a pH of not less than 10, preferably 10 to 11.5; blowing an oxygen-containing gas into the thus-obtained alkaline suspension; and further, if necessary, adjusting the pH of the alkaline suspension in the range of 5 to 9, preferably 6 to 7 so as to coat the surfaces of the granular magnetite particles with a hydroxide of aluminum.

The granular magnetite particles of the present invention are also obtained by adding 15 to 70 mol %, preferably 15 to 50 mol % of an aluminum compound (calculated as Al) based on a ferrous in an aqueous ferrous salt solution to an aqueous alkaline solution; adding the aqueous ferrous salt solution to the thus-obtained mixture so as to produce an alkaline suspension which contains a precipitate containing aluminum and iron and which has a pH of not less than 10, preferably 10 to 11.5; blowing an oxygen-containing gas into the thus-obtained alkaline suspension so as to produce granular magnetite particles; and (1) filtering out the granular magnetite particles, washing the granular magnetite particles with water and subjecting the granular magnetite particles to hydrophobic treatment; or (2) adjusting the pH of the alkaline suspension in the range of 5 to 9, preferably 6 to 8 so as to coat the surfaces of the granular magnetite particles with a hydroxide of aluminum, filtering out the granular magnetite particles, washing the granular magnetite particles with water and subjecting the granular magnetite particles to hydrophobic treatment.

As the aqueous alkaline solution in the present invention, sodium hydroxide, potassium hydroxide, etc. are usable.

Examples of the aluminum compound used in the present invention are aluminum sulfate, sodium aluminate, aluminum chloride and aluminum nitrate.

The amount of aluminum compound added is 15 to 70 mol % (calculated as Al) based on the ferrous. If the amount of aluminum compound added is less than 15 mol %, since it is impossible that a spinel-type crystal lattice contains not less than 3 wt % of aluminum element, it is impossible to obtain magnetite particles having a small magnetization. Although addition of more than 70 mol % of aluminum compound enables a spinel-type crystal lattice to contain aluminum element, since it is impossible that a spinel-type crystal lattice contains more than 6 wt % of aluminum element, it is meaningless to add an aluminum compound more than necessary.

As the aqueous ferrous salt solution in the present invention, aqueous ferrous sulfate solution, aqueous ferrous chloride solution, etc. are usable.

It is very important in the present invention to add an aluminum compound to an aqueous alkaline solution and subsequently add an aqueous ferrous solution thereto. If the order of addition is reversed, or an aluminum compound and an aqueous alkaline solution are added to the aqueous ferrous solution simultaneously, it is impossible that a spinel-type crystal lattice contains aluminum element, so that it is impossible to obtain granular magnetite particles having a small magnetization aimed at by the present invention. In the process disclosed in Japanese Patent Publication No. 1-36864 (1989) or Japanese Patent Application Laid-Open (KOKAI) No. 4-190242 (1992), acicular goethite particles are easily produced and mixed with granular magnetite particles. In contrast, in the present invention, the production of acicular goethite particles is suppressed, and granular magnetite particles are easily produced.

The pH of the alkaline suspension in the oxidization reaction according to the present invention is not less than 10. If the pH is less than 10, acicular goethite particles are easily produced and aluminum element is preferentially contained in the acicular goethite particles, so that it is difficult that a spinel-type crystal lattice in the granular magnetite particles contains aluminum elements.

The oxidization reaction in the present invention is brought about by blowing an oxygen-containing gas (e.g., air) into the alkaline suspension.

The temperature at the oxidization reaction is in the range of 70° to 100° C., preferably 80° to 95° C. If the temperature is lower than 70° C., acicular goethite particles are easily produced. Although it is possible that a spinel-type crystal lattice contains aluminum element even if the temperature exceeds 100° C., it is not industrially advantageous because a special apparatus such as an autoclave is required.

In the present invention, the surfaces of granular magnetite particles are coated with a hydroxide of aluminum by adjusting the pH of the alkaline suspension in the range of 5 to 9. If the pH is less than 5 or more than 9, it is difficult to produce a hydroxide of aluminum and aluminum remains in the suspension as aluminum ions without coating on the surfaces of the granular magnetite particles.

The hydrophobic treatment in the present invention may either be a dry treatment or a wet treatment, but a dry treatment is preferable. In this case, a wheel-type kneader, an attrition mill, a Henschel mixer, etc. are usable. The amount of hydrophobic treatment agent added is 0.1 to 5.0 wt %, preferably 0.1 to 2.5 wt % based on the granular magnetite particles. If the amount of the hydrophobic treatment agent is less than 0.1 wt %, the hydrophobic treatment is insufficient. On the other hand, if the amount exceeds 5.0 wt %, the whole content of the hydrophobic treatment agent is not adsorbed on the particle surfaces but a part of the hydrophobic treatment agent unfavorably exists alone.

The hydrophobic treatment of the granular magnetite particles after being coated with a hydroxide of aluminum is conducted in the same way as the hydrophobic treatment of the granular magnetite particles which are not coated with a hydroxide of aluminum.

In the present invention it is the most important fact that if an aluminum compound and an aqueous ferrous salt solution are added to an aqueous alkaline solution in that order, the amount of aluminum compound added is specified range, and the pH at the time of oxidization reaction is in a specified range, it is possible that a spinel-type crystal lattice of the granular magnetite particles contains aluminum element and, as a result, granular magnetite particles having a small magnetization are obtained.

The reason why it is possible that a spinel-type crystal lattice of the granular magnetite particles contains aluminum element is not clear, but the present inventors consider, from the fact that when the order of addition of an aluminum compound and an aqueous ferrous salt solution is changed, when the amount of aluminum compound added is less than 15 mol % based on the ferrous or when the pH in the oxidization reaction is less than 10, it is impossible to obtain granular magnetite particles having a small magnetization, as shown in later-described comparative examples, that the granular magnetite particles containing aluminum element in a spinel-type crystal lattice are obtained due to the synergistic effect of the order of addition of an aluminum compound and an aqueous ferrous salt solution, the amount of aluminum added and the pH at the time of oxidization reaction.

Figure 1:
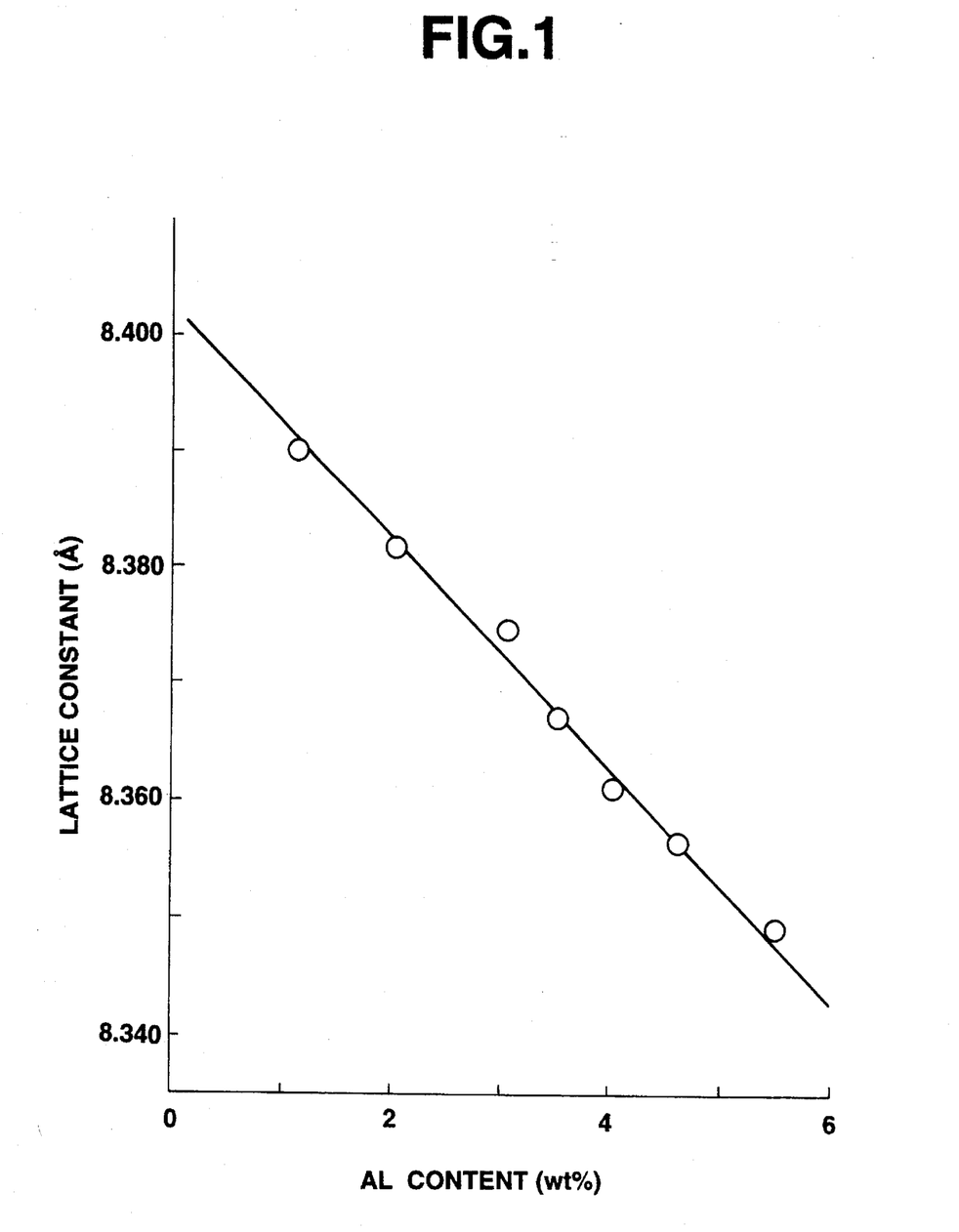
FIG. 1 shows the relationship between the content of aluminum element in a crystal lattice having a spinel structure of granular magnetite particles according to the present invention and a lattice constant.

With respect to the reason why granular magnetite particles having a small magnetization are obtained, the present inventors consider as follows. The lattice constant of the granular magnetite particles of the present invention is as smaller as 8.349 to 8.367 Å than a lattice constant of about 8.4 Å of magnetite particles which do not contain an aluminum element in a spinel-type crystal lattice, as will be shown in later-described examples. Since the larger the content of aluminum element is, the smaller the lattice constant is apt to be, as shown in FIG. 1, an aluminum element is recognized to exert a strong influence on the formation of a spinel-type crystal lattice. It is, therefore, considered that the iron element having a magnetic moment which is contained in a spinel-type crystal lattice is replaced by an aluminum element which does not have a magnetic moment and is contained in a spinel-type crystal lattice in place of the iron element.

A part of many experiments conducted by the present inventors will be extracted and explained in the following.

FIG. 1 shows the relationship between the content of aluminum element in a spinel-type crystal lattice of granular magnetite particles according to the present invention and a lattice constant. The content of aluminum element in the granular magnetite particles obtained in the same way as in Example 1, which will be described later, except that the amount of an aqueous $Al_2(SO_4)_3$ solution were varied, and the lattice constant were measured and plotted. As shown in FIG. 1, the larger the content of aluminum element is, the smaller the lattice constant of the granular magnetite particles is apt to be.

If the granular magnetite particles according to the present invention are coated with a hydroxide of aluminum, since the hydroxide of aluminum is non-magnetic, the granular magnetite particles can have a smaller magnetization. In addition, since it is possible to control the charge on the granular magnetite particles in the range of −30 to 20 μC/g, the granular magnetite particles can be appropriately used for various kinds of magnetic toner in accordance with the purpose of use.

When the granular magnetite particles having a hydrophilic property are subjected to a hydrophobic treatment in accordance with the present invention, the hydrophilic property thereof is changed to a hydrophobic property, and the dispersibility of the granular magnetite particles in a resin is enhanced. This is confirmed from the fact that while the monolayer adsorption capacity of $H_2O$ of the granular magnetite particles, which shows the water adsorptivity of the granular magnetite particles, before the hydrophobic treatment, is 1.41 mg/g, the monolayer adsorption capacity of $H_2O$ of the granular magnetite particles after the hydrophobic treatment reduces to 1.20 mg/g, as will be shown in Example 7 later.

If the granular magnetite particles according to the present invention are coated with a hydroxide of aluminum, and further subjected to hydrophobic treatment, since the hydroxide of aluminum is non-magnetic, the granular magnetite particles can have a smaller magnetization. The monolayer adsorption capacity of $H_2O$ of the granular magnetite particles after the hydrophobic treatment reduces in comparison with that of the granular magnetite particles before the hydrophobic treatment, as will be shown in Example 12 to 16 later. In other words, the hydrophilic property of the granular magnetite particles is changed to a hydrophobic property.

The zinc ferrite particles or the zinc manganese ferrite particles in Japanese Patent Application Laid-Open (KOKAI) No. 4-184354 (1992) assume a brown color, as indicated by the hue of $13 \leq L^* \leq 20$, $a^* > 0.7$, $-3 \leq b^* \leq 0$. In contrast, the granular magnetite particles of the present invention assume a hue of $13 \leq L^* \leq 20$, $-1 \leq a^* \leq 0.7$, $-3 \leq b^* \leq 0$. In other words, since $a^*$ is as small as not more than 0.7, the granular magnetite particles assume a sufficient black color which magnetite particles possess intrinsically.

In the granular magnetite particles of the present invention, no goethite particles contain.

Since the granular magnetite particles of the present invention assume a black color and they have a small magnetic agglomeration force due to a small magnetization, they are suitable as materials for coloring pigments for coatings, printing inks, rubber and plastics, and materials for magnetic toners, magnetic carriers and magnetic cards.

In addition, since the granular magnetite particles of the present invention assume a black color, and they have a small magnetization and a high dispersibility in a vehicle or a resin due to the hydrophobic surfaces, they are suitable as materials for coloring pigments for coatings, printing inks, rubber and plastics, and materials for magnetic toners and magnetic carriers.

EXAMPLES

The present invention will be explained in more detail hereinunder with reference to the following examples and comparative examples.

The shapes of the particles in the following examples and comparative examples were observed through a transmission electron microscope and a scanning electron microscope.

The average particle diameter of the particles in each of the following examples are expressed by the average values measured in electron microphotographs.

The magnetic characteristics of the magnetic particles were measured under a magnetic field of 1 kOe by "Vibration Sample Magnetometer VSM-3S-15" (manufactured by Toei Kogyo, Co., Ltd.).

The amount of Al contained in the granular magnetite particles was expressed by the value measured by "High-Frequency Plasma Emission Spectrophotometer ICAP-575" (Manufactured by Japan Jourel Ash Co., Ltd.).

The lattice constant of the granular magnetite particles was expressed by the value measured by "X-ray Diffractometer RAD-2A" (Manufactured by Rigaku Denki Co., Ltd.)

The amount of hydrophobic treatment agent with which the granular magnetite particles were coated was calculated as C by measuring the carbon by "Carbon/Sulfur Analyzer EMIA-2200" (Manufactured by Horiba Seisakusho Co., Ltd.).

The hydrophobic degree was expressed by the monolayer adsorption capacity of $H_2O$ measured by the "Water Vapor Adsorber BELSORP 18" (Manufactured by Japan Bell, Ltd.). The granular magnetite particles were degassed at 120° C. for 2 hours, and the water vapor adsorption isotherm was measured at an adsorption temperature of 25° C. The hydrophobic degree was obtained by a BET method.

The hue was expressed by the $L^*$ value (lightness), the $a^*$ value and the $b^*$ value. These values were measured in the Hunter's Lab space by using a Light-Source Spectrophotometric Colorimeter MSC-1S-2D (Manufactured by Suga Testing Machine, Ltd.), and expressed in accordance with the uniform sensory color space determined by Commission Internationale de l'Exlairage CIE, 1976.

The test piece for measuring the hue was obtained by kneading 0.5 g of the granular magnetite particles and 0.5 cc of castor oil in the form of a paste by a Hoover muller, adding a clear lacquer to the paste and kneading the mixture to make a coating, and applying the coating onto a cast-coated paper by using a 6-mil applicator.

<Production of Granular Magnetite Particles>

Examples 1 to 6, Comparative Examples 1 to 4

Example 1

5 liter of an aqueous $Al_2(SO_4)_3$ solution of 0.672 mol/liter was added to an aqueous 4.3-N NaOH solution, and 14.93 liter of an aqueous ferrous sulfate solution of 1.8 mol/liter was added to the obtained mixture to obtain 42 liter in total of an alkaline suspension which contained a precipitate containing aluminum and iron. The pH of the alkaline suspension was 10.6. The temperature of the alkaline suspension was raised and air was blown into the alkaline suspension at 90° C. at a flow rate of 100 liter/min for 110 minutes so as to produce a black precipitation. The black precipitation was filtered out, washed with water, dried at 60° C., thereby obtaining black particles.

The black particles obtained proved to be granular particles as a result of observation through an electron microscope. As a result of X-ray diffraction, only the peak of a spinel type crystal was observed. The BET specific surface was 8.5 m²/g and the average particle diameter was 0.22 μm.

The black particles contained 3.54 wt % of aluminum and the lattice constant was 8.367 Å. With respect to the magnetic characteristics, the magnetization was 43.9 emu/g.

Examples 2 and 3, Comparative Examples 1 to 4

Magnetite particles were obtained in the same way as in Example 1 except for varying the order of adding the aqueous alkaline solution, the aluminum compound and the aqueous ferrous salt solution, the kind and the amount of aluminum compound added, and the pH and the temperature of the alkaline suspension.

The main producing conditions and the properties of the magnetite particles obtained are shown in Table 1. The average particle diameter of the magnetite particles obtained in Example 2 was 0.31 μm and the average particle diameter of the magnetite particles obtained in Example 3 was 0.19 μm.

In the black particles produced in each of Examples 2 and 3, only the peak of a spinel type crystal was observed.

In the particles produced in Comparative Examples 2 and 4, the peak of a spinel type crystal and the peak of goethite were observed as a result of X-ray diffraction. When the particles were observed through an electron microscope, granular particles and acicular particles were observed. It was, therefore, recognized that the particles obtained were a mixture of granular magnetite particles and non-magnetic acicular goethite particles. It was for this reason that the magnetization was small.

Example 4

A part of the reaction mother liquor containing the black precipitation obtained in Example 1 was collected, and the pH of the obtained solution was adjusted by adding sulfuric acid under stirring so as to coat the surfaces of the granular magnetite particles with a hydroxide of aluminum. The black precipitation was filtered out, washed with water and dried at 60° C., thereby obtaining black particles.

As a result of measurement, the amount of aluminum in the black particles obtained was 6.74 wt %. Since the aluminum element contained in a spinel-type crystal lattice was 3.54 wt %, as described above, it was recognized that the amount of aluminum coating the particles was 3.20 wt % (6.74−3.54=3.20). The average particle diameter of the granular magnetite particles obtained was 0.22 μm.

The main producing conditions and the properties of the granular magnetite particles obtained are shown in Table 1.

Examples 5 and 6

Granular magnetite particles were coated with a hydroxide of aluminum in the same way as in Example 4 except for varying the kind and the pH of the reaction mother liquor containing the black precipitation.

The main producing conditions and the properties of the granular magnetite particles obtained are shown in Table 1. Further the average particle diameter of the obtained magnetite particles was almost the same as that of the raw material particles.

<Hydrophobic Treatment of Granular Magnetite Particles>

Examples 7 to 23

Example 7

10 kg of the granular magnetite particles obtained in Example 2 and 15 g of silane coupling agent A-143 (produced by Nippon Unicar Co., Ltd.) were charged into a wheel type kneader (Sandmill: trade name, manufactured by Matsumoto Chuzo Tekkosho Co., Ltd.) and the kneader was driven for one hour for the purpose of hydrophobic treatment.

The granular magnetite particles coated with the silane coupling agent obtained had a carbon content of 0.03 wt %, a magnetization of 40.3 emu/g, a BET specific surface area of 5.7 m$^2$/g, an average particle diamer of 0.31 μm, and a monolayer adsorption capacity of $H_2O$ of 1.20 mg/g.

Examples 8 to 23

Granular magnetite particles were subjected to hydrophobic treatment in the same way as in Example 7 except for varying the kind of the magnetic particles and the kind and the amount of hydrophobic treatment agent.

The main producing conditions and the properties of the granular magnetite particles obtained are shown in Table 2. Further the average particle diameter of the obtained magnetite particles was almost the same as that of the raw material particles.

TABLE 1 (I)

| | Production of Grandular Magnetite Particles | | | | |
|---|---|---|---|---|---|
| Examples and Comparative Examples | Order of adding raw materials | Al compound | | Oxidation of alkaline suspension | |
| | | Kind | Amount added (mol %) | pH | Temperature (°C.) |
| Example 1 | A | Aluminum sulfate | 25.0 | 10.6 | 90 |
| Example 2 | A | Aluminum sulfate | 40.0 | 10.2 | 85 |
| Example 3 | A | Sodium aluminate | 63.0 | 11.4 | 75 |
| Example 4 | A | Aluminum sulfate | 25.0 | 10.6 | 90 |
| Example 5 | A | Aluminum sulfate | 40.0 | 10.2 | 85 |
| Example 6 | A | Sodium aluminate | 63.0 | 11.4 | 75 |
| Comp. Example 1 | B | Sodium aluminate | 8.6 | 9.5 | 90 |
| Comp. Example 2 | A | Aluminum sulfate | 25.0 | 6.5 | 85 |
| Comp. Example 3 | A | Sodium aluminate | 10.0 | 10.7 | 65 |
| Comp. Example 4 | C | Aluminum sulfate | 40.0 | 8.0 | 80 |

(Note): Order of adding raw materials:
A; An aluminum compound was first added to an aqueous alkaline solution, and an aqueous ferrous salt solution was then added to the thus-obtained mixture.
B: An aqueous alkaline solution was first added to an aqueous ferrous salt solution, and an aluminum compound was then added to the thus-obtained mixture when the $Fe^{2+}/Fe^{3+}$ in the reaction solution was 5.
C: An aluminum compound and an aqueous ferrous salt solution were simultaneously added to an aqueous alkaline solution.

TABLE 1 (II)

| | Coating process of hydroxide of aluminum pH | Granular magnetic particles Al content (wt %) | Al content coating the particless surfaces (wt %) | Lattice constant (Å) | Magnetization (emu/g) |
|---|---|---|---|---|---|
| Example 1 | — | 3.54 | — | 8.367 | 43.9 |
| Example 2 | — | 4.62 | — | 8.356 | 40.4 |
| Example 3 | — | 5.48 | — | 8.349 | 32.1 |
| Example 4 | 7.0 | 3.54 | 3.20 | 8.367 | 37.5 |
| Example 5 | 5.3 | 4.62 | 5.48 | 8.356 | 30.4 |
| Example 6 | 8.7 | 5.48 | 7.82 | 8.349 | 23.1 |
| Comp. Example 1 | — | 2.10 | — | 8.381 | 55.1 |
| Comp. Example 2 | — | 6.01 | — | 8.384 | 26.8 |
| Comp. Example 3 | — | 2.30 | — | 8.379 | 53.2 |
| Comp. Example 4 | — | 8.23 | — | 8.381 | 18.4 |

TABLE 1 (III)

| | Granular magnetite particles BET specific surface area ($m^2/g$) | Presence of goethite | Monolayer adsorption capacity of $H_2O$ (mg/g) | Hue $L^*$ | $a^*$ | $b^*$ |
|---|---|---|---|---|---|---|
| Example 1 | 8.5 | None | 1.23 | 15.4 | 0.35 | −0.91 |
| Example 2 | 5.8 | None | 1.41 | 15.1 | 0.40 | −0.84 |
| Example 3 | 10.3 | None | 1.67 | 14.7 | 0.43 | −0.79 |
| Example 4 | 31.9 | None | 7.37 | 15.3 | 0.36 | −0.93 |
| Example 5 | 38.6 | None | 12.14 | 15.3 | 0.40 | −0.80 |
| Example 6 | 52.7 | None | 16.11 | 14.6 | 0.41 | −0.78 |
| Comp. Example 1 | 12.1 | Presence | — | — | — | — |
| Comp. Example 2 | 73.1 | Presence | — | — | — | — |
| Comp. Example 3 | 9.7 | Presence | — | — | — | — |
| Comp. Example 4 | 87.6 | Presence | — | — | — | — |

TABLE 2 (I)

| Examples | Particles to be treated Example number | Monolayer adsorption capacity of $H_2O$ (mg/g) | Hydrophobic Treatment agent | Amount added (wt %) |
|---|---|---|---|---|
| Example 7 | Example 2 | 1.41 | Silane coupling agent | 0.15 |
| Example 8 | Example 2 | 1.41 | Silane coupling agent | 2.0 |
| Example 9 | Example 2 | 1.41 | Silane coupling agent | 4.5 |
| Example 10 | Example 2 | 1.41 | Titanate coupling agent | 1.0 |
| Example 11 | Example 2 | 1.41 | Titanate coupling agent | 3.5 |
| Example 12 | Example 6 | 16.11 | Silane coupling agent | 1.5 |
| Example 13 | Example 6 | 16.11 | Silane coupling agent | 3.0 |
| Example 14 | Example 6 | 16.11 | Titanate coupling agent | 0.15 |
| Example 15 | Example 6 | 16.11 | Titanate coupling agent | 2.5 |
| Example 16 | Example 6 | 16.11 | Titanate coupling agent | 5.0 |
| Example 17 | Example 1 | 1.23 | Isopalmitic acid | 0.15 |
| Example 18 | Example 1 | 1.23 | Isopalmitic acid | 2.0 |
| Example 19 | Example 1 | 1.23 | Isopalmitic acid | 4.5 |

TABLE 2 (I)-continued

| | Hydrophobic treatment | | | |
|---|---|---|---|---|
| | Particles to be treated | | | |
| Examples | Example number | Monolayer adsorption capacity of $H_2O$ (mg/g) | Hydrophobic Treatment agent | Amount added (wt %) |
| Example 20 | Example 4 | 7.37 | Isopalmitic acid | 1.5 |
| Example 21 | Example 4 | 7.37 | Isopalmitic acid | 3.0 |
| Example 22 | Example 3 | 1.67 | Silane | 1.5 |
| Example 23 | Example 5 | 12.14 | coupling agent Silane coupling agent | 3.5 |

TABLE 2 (II)

| | Granular magnetite particles subjected to hydrophobic treatment | | | | | | |
|---|---|---|---|---|---|---|---|
| | Carbon content coating the particle surfaces (wt %) | Magnetization (emu/g) | BET specific surface area (m²/g) | Monolayer adsorption capacity of $H_2O$ (mg/g) | Hue L* | a* | b* |
| Example 7 | 0.03 | 40.3 | 5.7 | 1.20 | 15.1 | 0.39 | −0.83 |
| Example 8 | 0.38 | 39.7 | 4.6 | 0.71 | 15.2 | 0.39 | −0.84 |
| Example 9 | 0.77 | 39.1 | 3.5 | 0.42 | 15.1 | 0.40 | −0.85 |
| Example 10 | 0.71 | 39.8 | 4.1 | 0.92 | 15.0 | 0.41 | −0.85 |
| Example 11 | 2.43 | 39.2 | 3.0 | 0.61 | 15.0 | 0.40 | −0.84 |
| Example 12 | 0.26 | 22.9 | 45.0 | 8.86 | 14.7 | 0.44 | −0.78 |
| Example 13 | 0.52 | 22.6 | 38.3 | 6.61 | 14.6 | 0.44 | −0.77 |
| Example 14 | 0.10 | 22.9 | 49.0 | 14.02 | 14.8 | 0.43 | −0.77 |
| Example 15 | 1.75 | 22.5 | 35.1 | 8.54 | 14.7 | 0.42 | −0.79 |
| Example 16 | 3.51 | 21.9 | 27.2 | 5.96 | 14.6 | 0.43 | −0.78 |
| Example 17 | 0.11 | 43.8 | 8.3 | 1.08 | 15.5 | 0.35 | −0.92 |
| Example 18 | 1.48 | 43.0 | 6.1 | 0.65 | 15.5 | 0.34 | −0.92 |
| Example 19 | 3.34 | 42.0 | 4.6 | 0.40 | 15.4 | 0.33 | −0.91 |
| Example 20 | 1.12 | 36.9 | 22.3 | 7.01 | 15.4 | 0.33 | −0.91 |
| Example 21 | 2.23 | 36.4 | 17.4 | 3.49 | 15.3 | 0.35 | −0.89 |
| Example 22 | 0.31 | 31.7 | 8.2 | 0.92 | 14.6 | 0.43 | −0.79 |
| Example 23 | 0.63 | 29.5 | 30.4 | 8.12 | 15.0 | 0.39 | −0.84 |

What is claimed is:

1. Granular magnetite particles assuming a black color, having a magnetization of not more than 50 emu/g in a magnetic field of 1 kOe containing 3 to 6 wt % of elemental aluminum in a crystal lattice of magnetite having a spinel structure with a lattice constant of 8.340 to 8.375 Å.

2. Granular magnetite particles according to claim 1, wherein said magnetization in a magnetic field of 1 kOe is 30 to 50 emu/g.

3. Granular magnetite particles according to claim 1, wherein said granular magnetite particles are subjected to hydrophobic treatment including a hydrophobic treatment agent of a coupling agent, a silicone or a fatty acid and said magnetization in a magnetic field of 1 kOe is 28.5 to 50 emu/g.

4. Granular magnetite particles according to claim 1, wherein said granular magnetite particles are coated with a hydroxide of aluminum and said magnetization in a magnetic field of 1 kOe is 20 to 45 emu/g.

5. Granular magnetite particles according to claim 1, wherein said granular magnetite particles are coated with a hydroxide of aluminum and subjected to a hydrophobic treatment, including a hydrophobic treatment agent of a coupling agent, a silicone or a fatty acid and said magnetization in a magnetic field of 1 kOe is 19 to 45 emu/g.

6. Granular magnetite particles according to either of claims 3 or 5, wherein the surface of said granular magnetite particles is coated with a hydrophobic coating in an amount of 0.01 to 4.0 wt %.

7. Granular magnetite particles according to either of claims 4 or 5, wherein the content of said hydroxide of aluminum coated on the surface of said granular magnetite particles is 1 to 9 wt %.

8. Granular magnetite particles according to claim 1, wherein said granular magnetite particles have a BET specific surface area of 1 to 15 m²/g.

9. Granular magnetite particles according to claim 1, wherein said granular magnetite particles have a hue of $13 \leq L^* \leq 20$, $-1 \leq a^* \leq 0.7$ and $-3 \leq b^* \leq 0$.

* * * * *